J. P. KLEIN & A. FRIEDERICHS.
FLUID PRESSURE ENGINE.
APPLICATION FILED AUG. 8, 1908.
945,462.
Patented Jan. 4, 1910.
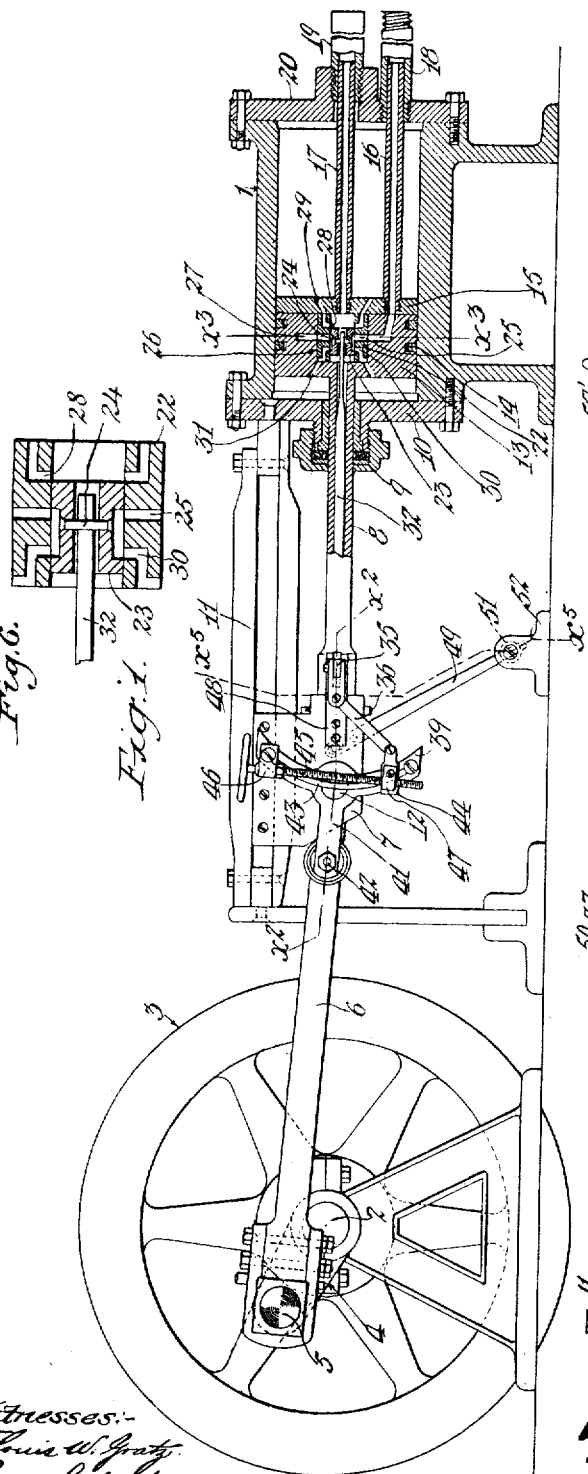
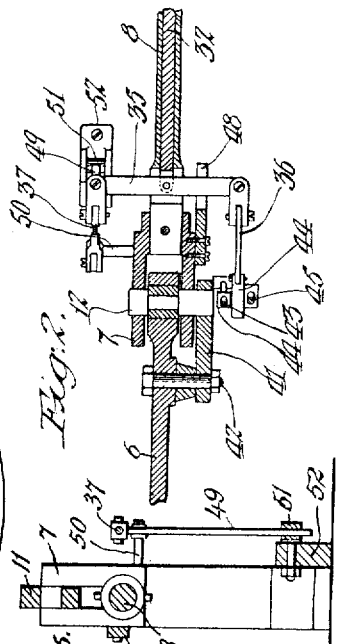

UNITED STATES PATENT OFFICE.

JACOB P. KLEIN AND ADOLF FRIEDERICHS, OF SAN BERNARDINO, CALIFORNIA.

FLUID-PRESSURE ENGINE.

945,462.   Specification of Letters Patent.   Patented Jan. 4, 1910.

Application filed August 8, 1908. Serial No. 447,641.

*To all whom it may concern:*

Be it known that we, JACOB P. KLEIN and ADOLF FRIEDERICHS, both citizens of the United States, residing at San Bernardino, in the county of San Bernardino and State of California, have invented a new and useful Fluid-Pressure Engine, of which the following is a specification.

The main object of this invention is to provide a steam or other fluid pressure engine which will be efficient in operation and simple and cheap in construction.

Another object of the invention is to provide for reversal of the engine, without the use of ports in the cylinder walls, thereby reducing to a minimum the clearance required in the cylinder.

A further object of the invention is to provide a fluid pressure engine in which the engine valves are operated by the rocking motion of the connecting rod, and the lead is given by the reciprocating motion of the piston rod.

Other objects of the invention will appear hereinafter.

The accompanying drawings illustrate our invention.

Figure 1 is a side elevation of an engine partly in section. Fig. 2 is a plan of the valve operating means. Fig. 3 is a vertical section on the line $x^3$—$x^3$ Fig. 1. Fig. 4 is a side elevation of an especial form of control for the valve operating means to regulate the cut-off and provide for reversal. Fig. 5 is a section on line $x^5$—$x^5$ in Fig. 1. Fig. 6 is a detail section of the valve means in the piston head.

1 designates a cylinder of the engine, 2 the main shaft, 3 the fly wheel, and 4 the crank connected by crank pin 5, the main or connecting rod 6 and cross head 7 to the piston rod 8 which slides through a stuffing box 9 on the back cylinder head 10. A guide 11 is provided for the cross head 7 which is secured to the connecting rod by cross head pin 12.

The piston 13 is attached to the piston rod 8 and slides in the cylinder 1, being provided with loose packing rings 14. A plate or disk 15 is attached to the piston head and has attached thereto an admission pipe 16 and an exhaust pipe 17, said pipes sliding respectively through sleeves 18, 19 which screw into the front cylinder head 20. Piston 13 is recessed back of a plate 15 to form a valve chamber 26, and a valve bushing 22 fits in said chamber and is held therein by piston plate 15. Said valve bushing has a tubular bore within which slides the valve 23 which is of shorter length than the tubular bore of the valve bushing and has intermediate its ends an annular groove 24 forming a valve passage. Valve bushing 22 has a plurality of ports 25 extending therethrough at its mid length communicating inwardly with the annular passage 24 around the valve and communicating outwardly with an annular recess 27 in the piston extending around the bushing. Said bushing is also provided with a set of ports 28 forwardly of the middle ports 25, said ports 28 communicating through openings 29 in the piston plate 15 with the forward steam space in the cylinder. Said valve bushing is further provided with a set of ports 30 opening into the tubular bore of the bushing rearwardly of the central ports 25 and communicating outwardly through passages 31 with the rear steam space of the cylinder. Admission pipe 16 connects with outer annular passage 27, and exhaust pipe 17 communicates with central passage or chamber 26.

Valve 23 is operated by means of a valve rod 32 extending longitudinally within the piston rod 8, said piston rod being bored to receive and fit the valve rod. To secure valve rod to the valve, it is extended into a longitudinal passage 33 in the valve and pinned to the valve by a cross pin 34. At the rear end of the valve rod is pivoted an equalizing lever 35 therefor, said lever being connected at its respective ends by two pivoted rods 36, 37 respectively to an operating mechanism and to a lead mechanism. The valve operating mechanism consists of a rocking lever or link 39 pivotally mounted on the cross head pin 12 of the cross-head and connected by arm 41 and clamp screw 42 to the connecting rod 6 of the engine, said lever having a longitudinal rod 43 on which travels a slide block 44 to which is pivotally connected the transmission rod 36. Suitable means such as a screw 45 supported by a block 46 fastened on the rocking lever 39 and working in a nut 47 fastened on the block 44 aforesaid, serves to shift the position of said block on said rod to control the operation of the valve. The rod 43 is concentric with the pivotal connection of the rod 36 to the lever 35 when the connecting rod 6 extends in line with the piston rod. A slotted guide 48 is provided for rod 36, The lead controlling means connected to the other end of the equalizing lever 35 consists of a lever 49 pivoted to the cross head 7 at 50 and pivoted at its upper end to adjusting rod 37, the lower end of said lever sliding in a pin 51 which is rotatably mounted on a fixed bracket 52.

The operation is as follows: When the slide block 44 is brought to the mid length of the guide rod 43 by means of the adjusting devices 45, etc., the engine is at rest, since in this position the valve member 23 has no travel within the piston but maintains an intermediate position wherein all communication between the admission and exhaust connections 16, 17 and the cylinder spaces is cut off. By moving the controlling devices 45, etc., to move the slide block 44 away from such position, for example, downwardly, as shown in Fig. 1, then assuming that the engine is not at a dead center, the stated operation will cause the valve 23 to shift longitudinally within the piston so as to open communication from admission connection 16 through passages 27, 25, 24, 30, 31 with the back steam space of the cylinder and from the front steam space of the cylinder through passages 29, 28, 26 to exhaust connection 17. The piston is thereby operated forwardly and on reaching the end of its stroke the rocking motion of the connecting rod 6 operates through the link member or rocking lever 39 to move the valve member 23 to the other side of the intermediate or dead position admitting and exhausting steam in the reverse manner to that above described and driving the piston in the opposite direction. The valve being again reversed at the other end of the stroke, etc., the effect of the link member or rocking lever 39 is to tend to reverse the valve at each end of the piston stroke and to open the valve widest at one-half stroke. It is desirable to provide a lead so that the valve will be opened widest before half stroke. For this purpose the lever 35 is provided which operates in response to the reciprocation of the piston rod and tends to make the farthest travel at each end of the stroke. The valve is controlled by the joint action of the two devices described, the rocking lever or link member 39 controlling the cut off in response to the rocking motion of the connecting rod and a lead lever 35 controlling the lead in response to the reciprocating movement of the piston rod.

On some stationary engines the lifting screw above described will be practicable, but on other engines more perfect control of the valve is needed when the engine is in operation, particularly locomotives, etc., the controlling means illustrated in Fig. 4 may be used. In this case the controlling slide block 44 is operated by the lifting rod 54 whose upper end slides through a member 54' pivotally connected at 55 to the slide 56 which slides vertically in the guide 57 fixed on the cross head guide 11 of the engine. A reversing link 58 is secured to slide 56 and a slide block 60 movable longitudinally in the slot 61 of said reversing link has a pivotal connection at 62 with the lifting rod 54. A lifting lever 64 is pivotally connected by a slot and pin at 65 with the slide 56 to raise the same and thereby control the position of the slide 44 in the cut off controlling lever or link 39. The slot in link or member 58 is curved so as to maintain the slide block 44 at definite height, in the oscillation of rod 54.

What we claim is:

1. In a fluid pressure engine, the combination with the cylinder, the piston working therein, the piston rod, connecting rod and main shaft having a crank connection to said connecting rod, said piston provided with valve means traveling therewith and means for operating said valve means comprising a valve rod extending longitudinally in the piston rod, an equalizing lever pivoted to the valve rod, a lead lever having a pivotal connection with the piston rod and with a fixed portion of the engine and having a connection with said equalizing lever at one side of its pivot, and a rocking lever connected to move with the connecting rod of the engine and having a connection with the said equalizing lever at the other side of the pivot thereof.

2. In a fluid pressure engine, the combination with the cylinder, the piston working therein, a piston rod, connecting rod and main shaft having crank connection to said connecting rod, said piston provided with valve means traveling therewith and means for operating said valve means comprising a valve rod extending longitudinally in the piston rod, a rocking lever connected to the connecting rod to move therewith and a connection between said lever and the valve rod to operate the valve rod by the angular movements of the connecting rod, said rocking lever being formed with a guide portion, a slide block traveling on said guide portion from one side to the other of said pivot lever and a link pivotally connected to said slide block having connection with the valve rod, and means for moving said slide block on said guide portion.

3. In a fluid pressure engine, the combination with the cylinder, the piston working therein, a piston rod, connecting rod and main shaft having crank connection to said connecting rod, said piston provided with valve means traveling therewith, and means for operating said valve means comprising a valve rod extending longitudinally in the piston rod, a rocking lever connected to the connecting rod to move therewith, a connection between said lever and the valve rod to operate the valve rod by the angular movements of the connecting rod, said rocking lever being formed with a guide portion, a slide block traveling on said guide portion from one side to the other of said pivot lever, a link pivotally connected to said slide block having connection with the valve rod, means for moving said slide block on said guide portion, comprising a vertically sliding member, a rod connecting said member to said slide block, a curved member having a sliding connection with said rod to maintain the slide block at definite height, and a lever connected to the vertically sliding member to operate the same.

In testimony whereof we have hereunto set our hands at this city San Bernardino, State of California, July, 1908.

JACOB P. KLEIN.
ADOLF FRIEDERICHS.

Witnesses:
RICHARD STROTHER,
FELIX SUBJECT.